H. BROOKS.
LIFTER.
APPLICATION FILED MAY 11, 1915.

1,232,488.

Patented July 10, 1917.

Hugh Brook
Inventor:

UNITED STATES PATENT OFFICE.

HUGH BROOKS, OF GLASGOW, MONTANA.

LIFTER.

1,232,488.　　　　Specification of Letters Patent.　　Patented July 10, 1917.

Application filed May 11, 1915. Serial No. 27,472.

*To all whom it may concern:*

Be it known that I, HUGH BROOKS, a citizen of the United States, residing at Glasgow, in the county of Valley and State of Montana, have invented certain new and useful Improvements in Lifters; and I do hereby declare the following to be a full, clear, and exact description of the invention, such as will enable others skilled in the art to which it appertains to make and use the same.

The general object of this invention is to admit of the handling of hot receptacles and stove lids, to be conveniently and expeditely done, without burning the hands of the operator. To this end the invention consists of a tubular handle having a lid engaging member located at one end thereof, and having a depending stationary jaw disposed below the lid engaging member, and a longitudinally slidable jaw located within the handle and normally held from engagement with the stationary jaw and a lever carried by the handle and having engagement with the sliding jaw for forcing the latter in the direction of the stationary jaw.

With the above and other objects in view as will more fully appear from that embodiment of my invention, of which the following is a specification, reference being had to the accompanying drawings forming a part thereof, in which.

Figure 1:
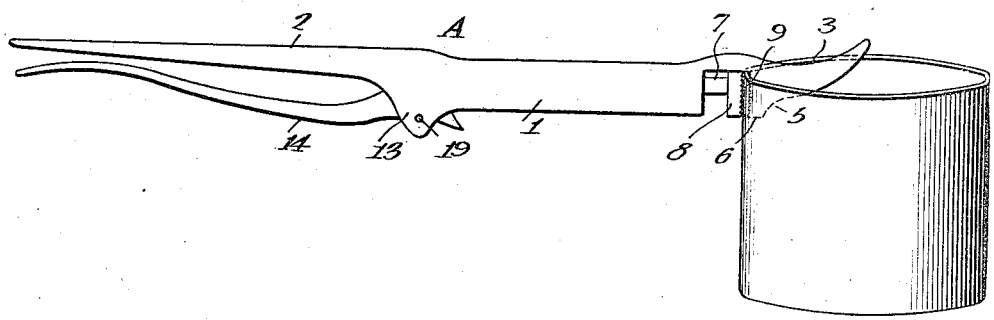
Figure 1 is a side view of the lifter applied to a receptacle.
Figure 3:
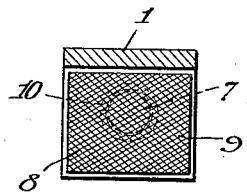
Fig. 3 is an end view of the lifter taken on the line 2—2 of Fig. 2, showing the movable jaw.
Figure 2:
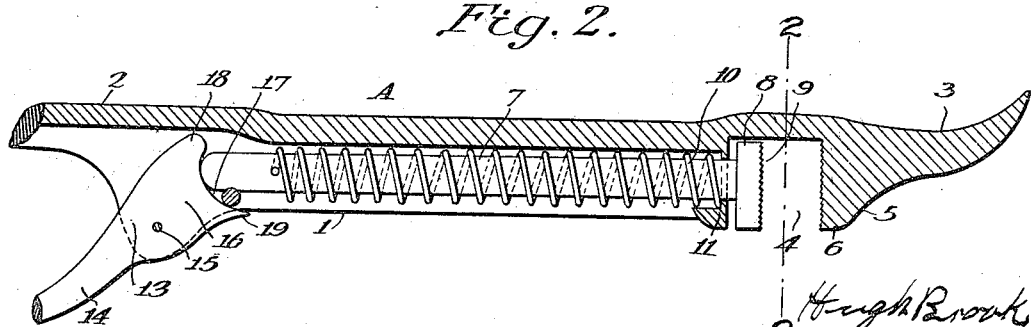
Fig. 2 is a longitudinal sectional view.

Referring more particularly to the drawings the letter A designates the lifter as an entirety. The lifter comprises a tubular handle 1 having located at one end thereof a hand grip 2, the opposite end of the handle being provided with an upwardly and outwardly curved lip 3 adapted to engage the recess in the ordinary stove lid.

The handle has the end upon which the lip 3 is formed, provided with a cut away portion 4 to provide a depending stationary jaw 5 the inner surface of which is provided with a serrated face 6.

Slidable within the tubular handle 1, is a rod 7, one end of which extends into an opening 4 and carries a movable jaw 8, the said jaw having its front face thereof provided with a serrated surface 9. The jaw 8 is normally held in spaced relation to the jaw 5 by means of a coiled spring 10, which surrounds the rod 7 and has one end bearing against an annular disk 11 through which passes the rod 7, and which is positioned against a shoulder formed by the cut away portion 4 in the end of the handle. The opposite end of the spring is secured in any suitable manner to the adjacent end of the rod 7.

The handle is provided, approximately at its point of juncture with the grip 2, with a pair of depending spaced ears 13, between which is pivotally mounted a lever 14 by means of a pivot pin 15. The lever 14 has an enlarged head 16, which extends into the interior of the handle and is cut away so as to provide a curved seat 17 for the adjacent end of the rod 7, and the opposed fingers 18 and 19. The finger 19 extends below the under surface of the handle and is adapted to engage the same, to limit the movement of the lever in downward direction.

When it is desired to lift the heated receptacle, the upper edge of the receptacle is inserted within the cut-away portion 4 and between the jaws 5 and 8. Pressure is then exerted upon the lever 14, causing the rear end of the rod 7 to ride over the curved face 17 and the inner curved surface of the finger 18, resulting in the forcing of the jaw 5 and the tensioning of the spring 10. This permits of the receptacle being tightly clamped between the movable jaw and the stationary and conveniently carried about, slipping of the receptacle from between the jaws during the carrying operation, being prevented by means of the serrated surfaces 6 and 9. When it is desired to release the lifter from the receptacle, pressure on the lever 14 is released, resulting in the spring 10 expanding and withdrawing the jaw 8 away from the jaw 5.

What is claimed is:

A device of the class described comprising a handle provided with depending edges, a stationary jaw on said handle, a stem carrying movable jaw housed in said handle, said stem terminating in a rounded end, a concave faced lever pivoted to said handle co-acting with the rounded end of said stem, and a stop for said lever engaging the lower end of said concave face.

In testimony whereof, I affix my signature in presence of two witnesses.

HUGH BROOKS.

Witnesses:
R. S. McKELLAR,
C. F. KENNEY.

Copies of this patent may be obtained for five cents each, by addressing the "Commissioner of Patents, Washington, D. C."